(12) United States Patent
Kojima et al.

(10) Patent No.: US 11,686,369 B2
(45) Date of Patent: *Jun. 27, 2023

(54) VIBRATION DAMPING DEVICE AND BOBBIN HOLDER SYSTEM

(71) Applicant: TMT Machinery, Inc., Osaka (JP)

(72) Inventors: Shogo Kojima, Kyoto (JP); Kakeru Kagata, Kyoto (JP); Yukio Ishida, Nagakute (JP)

(73) Assignee: TMT Machinery, Inc., Osaka (JP)

(*) Notice: Subject to any disclaimer, the term of this patent is extended or adjusted under 35 U.S.C. 154(b) by 846 days.

This patent is subject to a terminal disclaimer.

(21) Appl. No.: 16/496,842

(22) PCT Filed: Feb. 22, 2018

(86) PCT No.: PCT/JP2018/006425
§ 371 (c)(1),
(2) Date: Sep. 23, 2019

(87) PCT Pub. No.: WO2018/180056
PCT Pub. Date: Oct. 4, 2018

(65) Prior Publication Data
US 2020/0025276 A1    Jan. 23, 2020

(30) Foreign Application Priority Data

Mar. 31, 2017    (JP) .............................. JP2017-070446

(51) Int. Cl.
*F16F 15/10*    (2006.01)
*B65H 54/20*    (2006.01)
(Continued)

(52) U.S. Cl.
CPC ............. *F16F 15/10* (2013.01); *B65H 54/20* (2013.01); *F16F 9/12* (2013.01); *F16F 9/145* (2013.01);
(Continued)

(58) Field of Classification Search
CPC ........ F16F 15/10; F16F 15/005; F16F 15/145; F16F 15/16; F16F 15/31; F16F 9/12;
(Continued)

(56) References Cited

U.S. PATENT DOCUMENTS 1,107,731 A * 8/1914 Void ........................ F16F 15/10
                                                                    74/574.2
1,162,125 A * 11/1915 Bassett ................. F16C 19/547
                                                                    384/535
(Continued)

FOREIGN PATENT DOCUMENTS

CN        1547795 A      11/2004
CN       105668318 A      6/2016
(Continued)

OTHER PUBLICATIONS

Indian Office Action dated Oct. 29, 2020 in Indian Patent Application No. 201937039553, 5 pages.
(Continued)

*Primary Examiner* — Xuan Lan Nguyen
(74) *Attorney, Agent, or Firm* — Oblon, McClelland, Maier & Neustadt, L.L.P.

(57) ABSTRACT

A vibration damping device which is able to damp vibration of a rotating body in a high-speed range and to certainly accelerate the rotating body to the high-speed range is provided.
A vibration damping device 1 damping vibration of a rotating body 100 includes an automatic balancer 2 which is configured to cancel out imbalance of the rotating body 100 when the rotating body rotates 100; a liquid damper 4 which is coaxially rotatable with the rotating body 100 and includes a collision member 23 provided in a casing 20 in which liquid 22 is sealed, the liquid colliding with the collision member 23 when the liquid 22 moves in a circum-
(Continued)

ferential direction; and a relative rotation unit 5 which is configured to cause the liquid damper 4 to rotate relative to the rotating body 100.

18 Claims, 13 Drawing Sheets

(51) Int. Cl.
| | |
|---|---|
| *F16F 9/12* | (2006.01) |
| *F16F 9/14* | (2006.01) |
| *F16F 15/00* | (2006.01) |
| *F16F 15/14* | (2006.01) |
| *F16F 15/16* | (2006.01) |
| *F16F 15/31* | (2006.01) |
| *F16H 1/06* | (2006.01) |

(52) U.S. Cl.
CPC .......... *F16F 15/005* (2013.01); *F16F 15/145* (2013.01); *F16F 15/16* (2013.01); *F16F 15/31* (2013.01); *F16H 1/06* (2013.01); *B65H 2515/50* (2013.01); *F16F 2222/08* (2013.01); *F16F 2222/12* (2013.01); *F16F 2228/066* (2013.01); *F16F 2232/02* (2013.01); *F16F 2234/02* (2013.01)

(58) Field of Classification Search
CPC .... F16F 9/145; F16F 2222/08; F16F 2222/12; F16F 2228/066; F16F 2232/02; F16F 2234/02; B65H 54/20; B65H 2515/50; F16H 1/06
See application file for complete search history.

(56) References Cited

U.S. PATENT DOCUMENTS

| | | | | | |
|---|---|---|---|---|---|
| 4,237,703 | A | * | 12/1980 | Wahl, Jr. | H02K 49/106 464/29 |
| 5,460,017 | A | * | 10/1995 | Taylor | F16F 15/363 301/5.22 |
| 5,746,069 | A | * | 5/1998 | Kim | D06F 37/245 68/23.2 |
| 5,806,349 | A | | 9/1998 | Kim et al. | |
| 6,005,749 | A | | 12/1999 | Ikuta et al. | |
| 6,082,151 | A | * | 7/2000 | Wierzba | F16F 15/363 74/572.4 |
| 6,125,098 | A | * | 9/2000 | Osawa | G11B 19/2009 720/701 |
| 6,219,328 | B1 | * | 4/2001 | Kume | G11B 17/0282 |
| 6,550,292 | B1 | * | 4/2003 | Southworth | D06F 37/245 74/572.4 |
| 7,123,573 | B2 | * | 10/2006 | Kuo | G11B 25/043 369/264 |
| 7,435,211 | B2 | | 10/2008 | Kim et al. | |
| 7,492,549 | B2 | * | 2/2009 | Shishido | G11B 25/043 360/99.08 |
| 8,984,940 | B2 | * | 3/2015 | Josefczyk | F16F 15/363 73/458 |
| 10,883,564 | B2 | * | 1/2021 | Kagata | F16D 63/002 |
| 2002/0080711 | A1 | | 6/2002 | Han | |
| 2006/0109587 | A1 | | 5/2006 | Shishido et al. | |
| 2014/0069148 | A1 | | 3/2014 | Ohyagi | |
| 2015/0034435 | A1 | | 2/2015 | Seto et al. | |

FOREIGN PATENT DOCUMENTS

| | | |
|---|---|---|
| JP | 7-114984 B | 12/1995 |
| JP | 8-59077 A | 3/1996 |
| JP | 10-52591 A | 2/1998 |
| JP | 10-257710 A | 9/1998 |
| JP | 2001-233296 A | 8/2001 |
| JP | 2004-270822 A | 9/2004 |
| JP | 2006-144941 A | 6/2006 |
| JP | 3805940 B2 | 8/2006 |
| JP | 3843526 B2 | 11/2006 |
| JP | 2010-25187 A | 2/2010 |
| JP | 4509096 B2 | 7/2010 |
| JP | 2014-54385 A | 3/2014 |
| JP | 5922446 B2 | 5/2016 |
| WO | WO 2013/117841 A1 | 8/2013 |

OTHER PUBLICATIONS

Combined Chinese Office Action and Search Report dated Aug. 28, 2020 in Patent Application No. 201880015619.6 (with English language translation), 18 pages.
International Search Report dated May 15, 2018 in PCT/JP2018/006425 filed Feb. 22, 2018.
Korean Office Action dated May 14, 2020 in Korean Patent Application No. 10-2019-7017637 (with English translation), 21 pages.

* cited by examiner

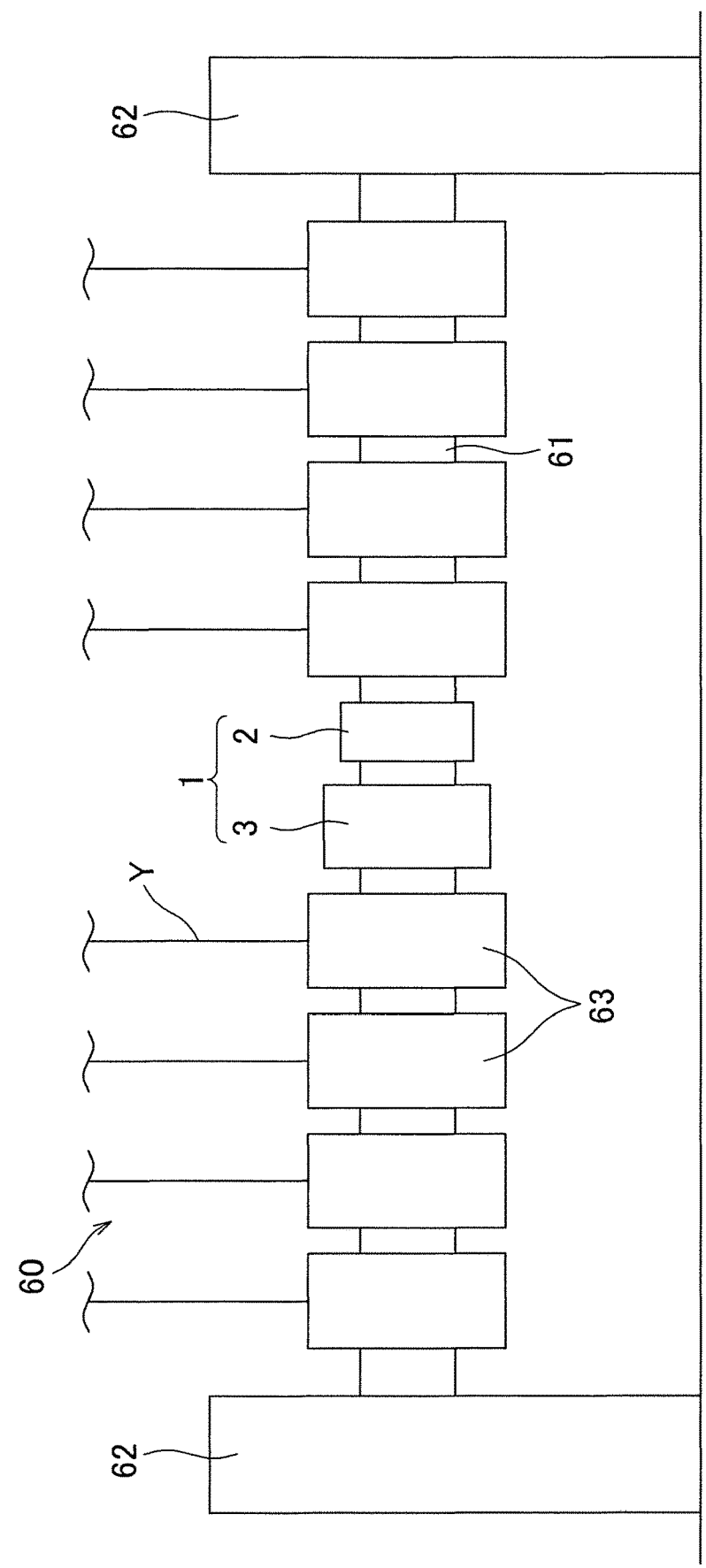

ROTATIONAL DIRECTION

ROTATIONAL DIRECTION

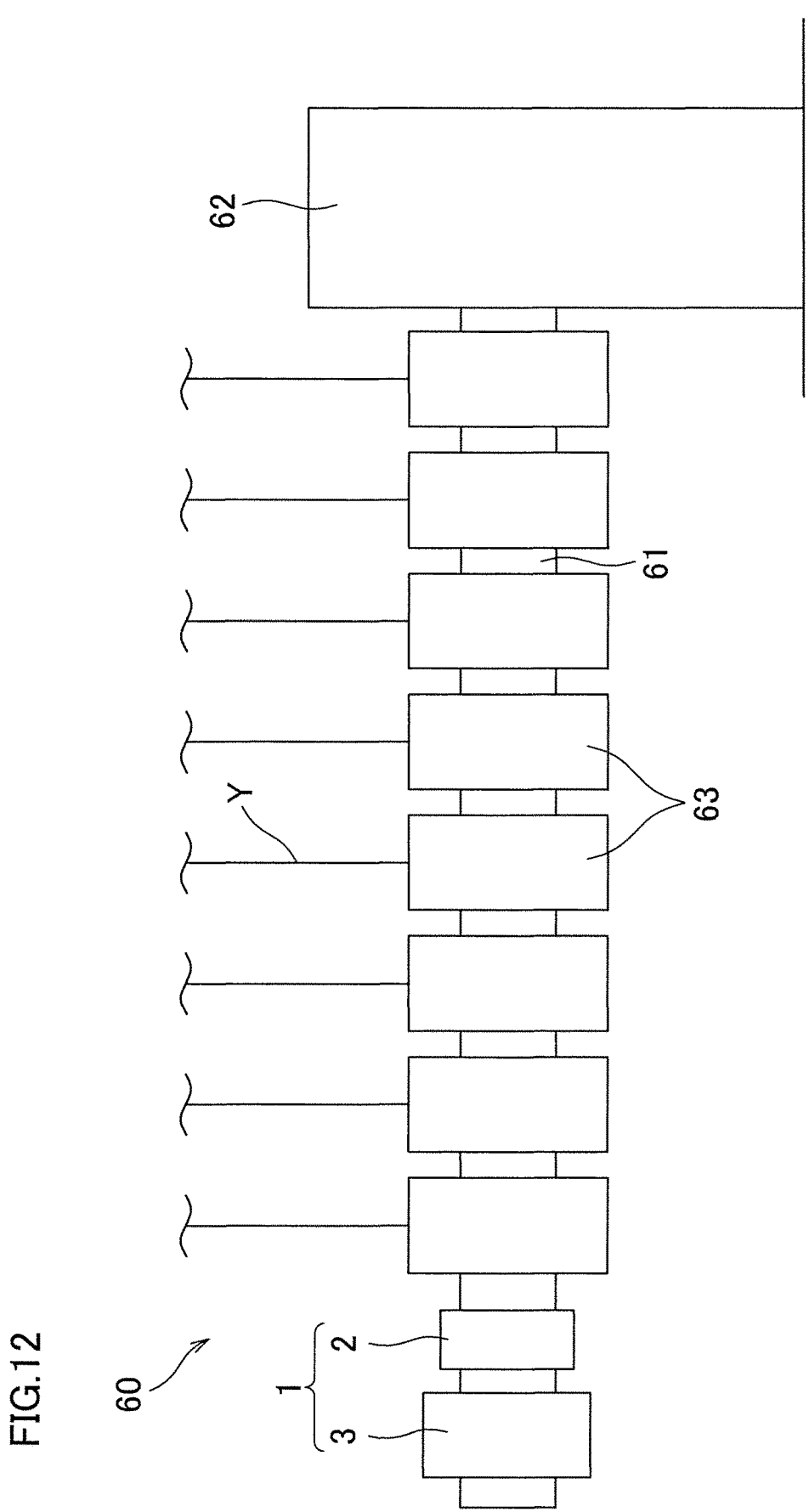

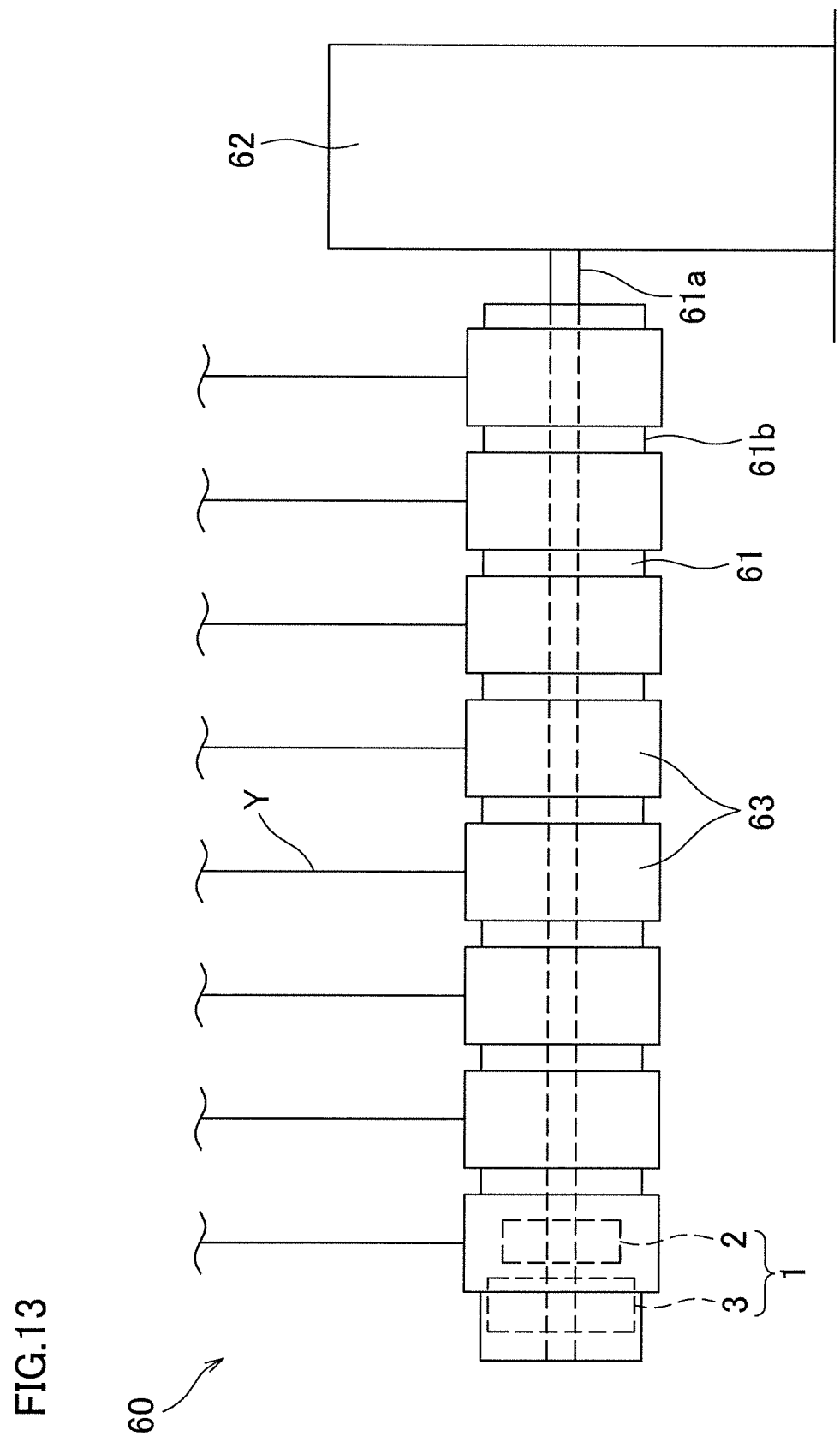

VIBRATION DAMPING DEVICE AND BOBBIN HOLDER SYSTEM

TECHNICAL FIELD

The present invention relates to a vibration damping device configured to damp vibration of a rotating body and a bobbin holder system in which the vibration damping device is attached to a bobbin holder.

BACKGROUND ART

For example, Patent Literatures 1 and 2 disclose, as a device for damping vibration of a rotating body, a ball balancer (a type of an automatic balancer) in which balls are movably housed in a casing. The ball balancer is capable of damping vibration of the rotating body as the balls move to positions where imbalance of the rotating body is canceled out, when the rotating body rotates. Known examples of the automatic balancer which damps vibration of the rotating body as the imbalance of the rotating body is canceled out by a mass body (the balls of the ball balancer) include a pendulum balancer, a ring balancer, and a liquid balancer, in addition to the ball balancer.

CITATION LIST

Patent Literatures

[Patent Literature 1] Japanese Examined Patent Publication No. H7-114984
[Patent Literature 2] Japanese Patent No. 4509096

SUMMARY OF INVENTION

Technical Problem

The automatic balancer described above is effective when, for example, the rotating body rotates in a high-speed range which is higher than a natural frequency. However, when the rotating body rotates in a low-speed range which is on the low speed side of the high-speed range, the vibration of the rotating body is scarcely damped, and may be amplified. This is because of a known phenomenon that the gravity center of the rotating body in the low-speed range is at a location radially away from the center of the rotating body (i.e., radially outside) whereas the gravity center of the rotating body in the high-speed range is on the opposite side over the center of the rotating body (i.e., radially inside) in the centrifugal direction. In the high-speed range, as the mass body such as the balls moves radially outward on account of the centrifugal force, the center of gravity at a radially outer part is moved toward the center of the rotating body, with the result that the vibration of the rotating body is damped. Meanwhile, in the low-speed range, as the mass body such as the balls moves radially outward on account of the centrifugal force, the center of gravity at a radially outer part is moved further away from the center of the rotating body, with the result that the vibration is disadvantageously amplified.

As such, the known automatic balancer succeeds in vibration damping in the high-speed range but disadvantageously amplify the vibration in the low-speed range. The vibration during resonance may be amplified and diverge by the automatic balancer. On this account, it is impossible to accelerate the rotating body to the high-speed range beyond the resonance range, and hence it is impossible to use the rotating body in the high-speed range.

The present invention has been made in view of this problem, and an object of the present invention is to provide a vibration damping device which is able to damp vibration of a rotating body in a high-speed range and to certainly accelerate the rotating body to the high-speed range.

Solution to Problem

A vibration damping device of the present invention is a vibration damping device damping vibration of a rotating body and includes: an automatic balancer which is configured to cancel out imbalance of the rotating body when the rotating body rotates; a liquid damper which is coaxially rotatable with the rotating body and includes a collision member provided in a casing in which liquid is sealed, the liquid colliding with the collision member when the liquid moves in a circumferential direction; and a relative rotation unit which is configured to cause the liquid damper to rotate relative to the rotating body.

In the present invention, the liquid damper is provided in addition to the automatic balancer. In the liquid damper, as the liquid collides with the collision member, part of kinetic energy is converted to heat energy, with the result that the vibration of the rotating body is suppressed. The vibration damping effect of this liquid damper is particularly conspicuous in the resonance range in which the liquid greatly flows and tends to collide with the collision member. Furthermore, in the present invention, because the liquid damper rotates relative to the rotating body thanks to the relative rotation unit, the orbital revolution of the rotating body due to whirling of the rotating body does not coincide with the axial rotation of the liquid damper. It is therefore possible to prevent the liquid from immovably adhering to the inner wall surface of the liquid damper due to the centrifugal force, and to facilitate the collision of the liquid onto the collision member. As such, the present invention is able to not only damp the vibration of the rotating body in the high-speed range by the automatic balancer but also effectively damp the vibration in the resonance range by the liquid damper. The acceleration of the rotating body to the high-speed range beyond the resonance range is therefore ensured.

The present invention may be arranged such that an air resistance imparting member which increases air resistance during rotation of the liquid damper is provided as the relative rotation unit.

With this arrangement, the rotational resistance is exerted against the liquid damper when the liquid damper rotates, and hence the rotation speed of the liquid damper becomes lower than that of the rotating body. As a result, the liquid damper rotates relative to the rotating body.

The present invention may be arranged such that the air resistance imparting member is a plate member having a surface intersecting with the rotational direction of the liquid damper.

With this arrangement, rotational resistance is exerted as air collides with the plate member when the liquid damper rotates. As a result, the rotation speed of the liquid damper becomes lower than that of the rotating body, and the liquid damper rotates relative to the rotating body. Furthermore, because the air resistance imparting member is the plate member, the air resistance imparting member is easily constructed.

The present invention may be arranged such that the plate member is provided on the outer circumferential surface of the liquid damper.

Because the acting position of the air resistance is distant from the center of the rotating body of the liquid damper, the torque of the rotational resistance exerted against the liquid damper is large. The rotation speed of the liquid damper is therefore efficiently lowered, and the relative rotation of the liquid damper with respect to the rotating body is further ensured.

The present invention may be arranged such that the plate member is provided on an end face in the axial direction of the liquid damper.

This arrangement prevents the vibration damping device from being upsized in the radial directions, and makes it possible to downsize the vibration damping device.

The present invention may be arranged such that a brake mechanism is provided as the relative rotation unit, the brake mechanism including: an electromagnetic effect target which is provided on the liquid damper and to which an electromagnetic effect is exerted; and an electromagnetic effector configured to exert the electromagnetic effect to the electromagnetic effect target.

When the relative rotation unit is an electromagnetic brake mechanism as described above, as the brake mechanism exerts the braking force to the liquid damper when the liquid damper rotates, the rotation speed of the liquid damper is arranged to be lower than that of the rotating body. As a result, the liquid damper rotates relative to the rotating body.

The present invention may be arranged such that a gear mechanism is provided as the relative rotation unit, the gear mechanism including: a gear portion which is formed on the outer circumferential surface of the liquid damper; a gear which is engaged with the gear portion; and a drive unit configured to generate rotational torque in the liquid damper by rotating the gear.

As the rotational torque is generated in the liquid damper by the gear mechanism in this way, the liquid damper rotates relative to the rotating body.

The present invention may be arranged such that the automatic balancer is a ball balancer in which balls are movably housed in a housing.

With this arrangement, vibration of the rotating body is damped as the balls move to positions where imbalance of the rotating body is canceled out, when the rotating body rotates. Furthermore, because the ball balancer has a relatively simple structure among automatic balancers, the structure of the vibration damping device is simplified.

The present invention may be arranged such that a partitioning member is provided to divide the inside of the housing into plural housing chambers in the circumferential direction, at least one ball is housed in each of the housing chambers, and the partitioning member prevents the ball housed in each of the housing chambers from moving to another housing chamber.

When the above-described partitioning member is not provided, the balls may keep turning in the housing when the rotating body rotates, and may not stay at the positions where the imbalance of the rotating body is canceled out. With the above-described partitioning member, the partitioning member prevents the balls from keep turning, and the balls quickly move to the positions where the imbalance of the rotating body is canceled out. When the rotating body is provided crosswise, the balls may not easily move upward on account of the gravity, depending on the rotation speed of the rotating body and the mass of the ball, etc. The influence of the gravity is suppressed by the partitioning member, because the balls are lifted by the partitioning member.

The present invention may be arranged such that the automatic balancer is a pendulum balancer including pendulums which are swingable in the circumferential direction of the rotating body.

Vibration of the rotating body is damped as the pendulums swing in the circumferential direction and move to positions where imbalance of the rotating body is canceled out, when the rotating body rotates.

The present invention may be arranged such that the automatic balancer is a ring balancer including ring members which are rotatable around the rotating body.

With this arrangement, vibration of the rotating body is damped as the ring members rotate around the rotating body and move to positions where imbalance of the rotating body is canceled out, when the rotating body rotates.

The present invention may be arranged such that the automatic balancer is a liquid balancer in which liquid is movably sealed in a casing.

Vibration of the rotating body is damped as the liquid is spread to cancel out the imbalance of the rotating body when the rotating body rotates.

A bobbin holder system of the present invention includes: a bobbin holder to which a bobbin is attached, the bobbin holder rotating so as to form a package by winding a yarn made of synthetic fibers onto the bobbin; and the vibration damping device described above, which is attached to the bobbin holder functioning as the rotating body.

The bobbin holder tends to be used in the high-speed range which is, for example, equal to or higher than 2000 rpm, and typically has a natural frequency in the low-speed range which is on the low speed side of the high-speed range. As the vibration damping device is attached to the bobbin holder, vibration is damped in the high-speed range in which the bobbin holder is used, and acceleration of the bobbin holder to the high-speed range beyond the resonance range is ensured.

The present invention may be arranged such that the vibration damping device is attached to a location on the bobbin holder corresponding to antinode of vibration in a predetermined resonance mode in which bending of the bobbin holder occurs.

Because the liquid damper vibration is damped by the liquid colliding with the collision members, the vibration damping effect is enhanced when the liquid damper is attached to a portion where the vibration is significant. The vibration damping effect of the liquid damper is therefore improved by attaching the vibration damping device to a location on the bobbin holder corresponding to antinode of vibration in the resonance mode (i.e., to a location where the variation is maximized).

The present invention may be arranged such that the bobbin holder is cantilevered, and the vibration damping device is attached to an end portion on the free end side of the bobbin holder.

Because in the liquid damper vibration is damped by the liquid colliding with the collision members, the vibration damping effect is enhanced when the liquid damper is attached to a portion where the vibration is significant. On this account, when the bobbin holder is cantilevered, the vibration damping device is attached to an end portion on the free end side of the bobbin holder, where the vibration is most significant. This makes it possible to improve the vibration damping effect of the liquid damper.

The present invention may be arranged such that the liquid damper is attached to a portion on the free end side of the bobbin holder as compared to the automatic balancer.

With this arrangement, the vibration damping device is attached to the portion where the vibration is most significant. This makes it possible to further improve the vibration damping effect of the liquid damper.

The present invention may be arranged such that the bobbin holder is supported at both ends, and the vibration damping device is attached to a substantially central portion in the axial direction of the bobbin holder.

Because in the liquid damper vibration is damped by the liquid colliding with the collision members, the vibration damping effect is enhanced when the liquid damper is attached to a portion where the vibration is significant. On this account, when the bobbin holder is supported at the both ends, the vibration damping device is attached to the central portion of the bobbin holder, where the vibration is most significant. This makes it possible to improve the vibration damping effect of the liquid damper.

The present invention may be arranged such that the vibration damping device is provided inside the bobbin holder.

The vibration damping effect for the bobbin holder is improved by providing the vibration damping device inside the bobbin holder in this way. Furthermore, the following effects are attained: improvement in the degree of freedom in the attachment position of the bobbin on the bobbin holder; increase in the maximum number of the bobbins attachable to the bobbin holder; and improvement in workability when the bobbin is attached to and detached from the bobbin holder.

BRIEF DESCRIPTION OF DRAWINGS

FIG. 6 is a side view showing a bobbin holder system to which the vibration damping device is attached.

FIG. 12 is a side view showing a modification of the bobbin holder system.

FIG. 13 is a side view showing a modification of the bobbin holder system.

DESCRIPTION OF EMBODIMENTS

Embodiment

Figure 1:
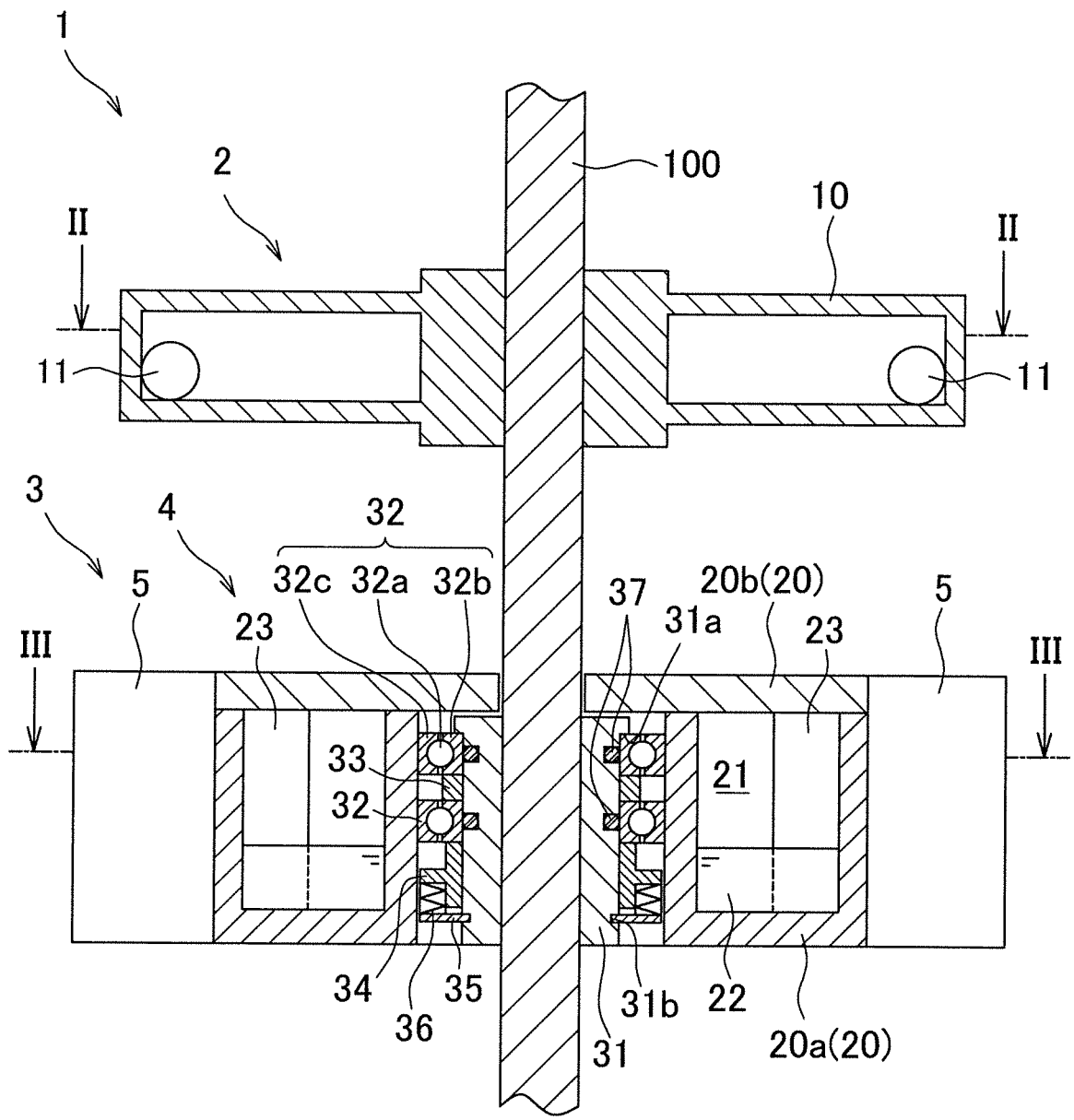
FIG. 1 is a cross section of a vibration damping device of an embodiment.
Figure 2:
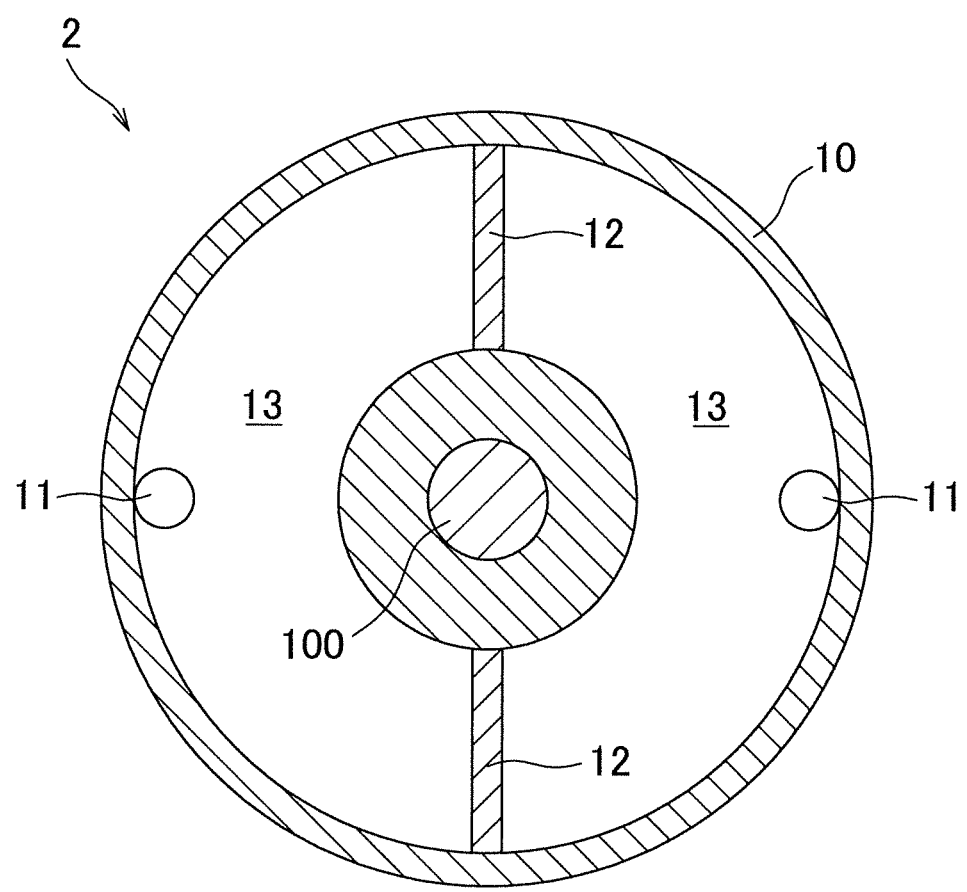
FIG. 2 is a cross section taken along a line II-II in FIG. 1.
Figure 3:
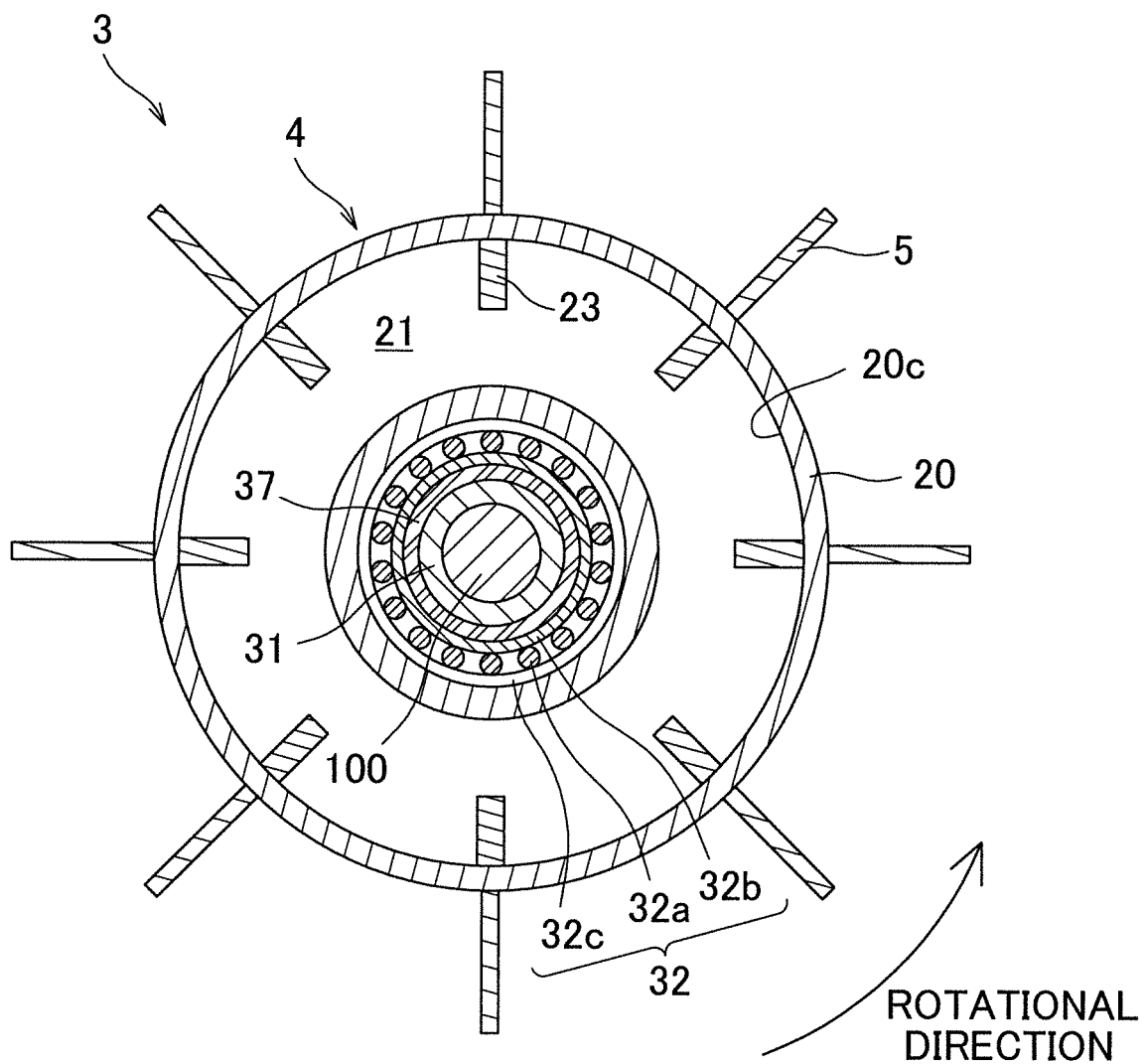
FIG. 3 is a cross section taken along a line III-III in FIG. 1.

The following will describe an embodiment of a vibration damping device related to the present invention. FIG. 1 is a cross section of the vibration damping device of the present embodiment, and is taken along the axial direction of a rotating body 100. FIG. 2 is a cross section taken along a line II-II in FIG. 1, and FIG. 3 is a cross section taken along a line III-III in FIG. 1. While the explanations below presuppose that the axial direction of the rotating body 100 is identical with the up-down direction, the axial direction of the rotating body 100 may be a direction different from the up-down direction.

The vibration damping device 1 of the present embodiment is attached to the outer circumferential surface of the rotating body 100 and includes a ball balancer 2 and a liquid damper system 3. The ball balancer 2 is an automatic balancer in which balls 11 are movably housed in a cylindrical housing 10 which is fixed to the rotating body 100. As shown in FIG. 2, in the housing 10, plural (two in the present embodiment) partitioning members 12 are provided at regular intervals in the circumferential direction. With this, the internal space of the housing 10 is divided into plural (two in the present embodiment) housing chambers 13 in the circumferential direction. One ball 11 is housed in each housing chamber 13. The ball 11 housed in each housing chamber 13 cannot move to another housing chamber 13 on account of the partitioning member 12.

When the ball balancer 2 structured as described above is attached to the rotating body 100, the balls 11 move to positions where imbalance of the rotating body 100 is canceled out when the rotating body 100 rotates, with the result that vibration on account of the imbalance of the rotating body 100 is suppressed. However, as described above, the automatic balancer such as the ball balancer 2 exerts a vibration damping effect when the rotating body 100 rotates in a high-speed range, but the vibration of the rotating body 100 is rarely damped and rather amplified when the rotating body 100 rotates in a low-speed range. For this reason, when the natural frequency of the rotating body 100 is in the low-speed range, the vibration during resonance may be amplified by the automatic balancer and diverge, and the rotating body 100 cannot be accelerated to the high-speed range beyond the resonance range.

To solve this problem, the vibration damping device 1 of the present embodiment includes the liquid damper system 3 in addition to the ball balancer 2. The liquid damper system 3 includes a liquid damper 4 and plate members 5 which form a relative rotation unit (air resistance imparting member). The liquid damper 4 is arranged such that liquid 22 is sealed in an internal space 21 of a casing 20. The liquid damper 4 is attached to the rotating body 100 to be coaxially rotatable with the rotating body 100. While the liquid 22 in the present embodiment is water, the liquid 22 may not be water.

The casing 20 includes a casing main body 20a and a lid member 20b, and is on the whole cylindrical. The casing main body 20a is open top, and the lid member 20b is fixed to the upper surface of the casing main body 20a by a bolt, etc. to close the opening. The casing 20 has the annular internal space 21, and the rotating body 100 penetrates a central portion of the casing 20.

A cylindrical boss 31 is fixed to the outer circumferential surface of the rotating body 100. To the outer circumferential surface of the boss 31, two bearings, i.e., upper and lower bearings 32 are fixed. While the bearings 32 in the present embodiment are ball bearings each having balls 32a, the bearings 32 may not be ball bearings. At an upper part of the outer circumferential surface of the boss 31, a stepped portion 31a is formed. The upper bearing 32 is externally fitted to the boss 31 while being in contact with the stepped portion 31a. Below the upper bearing 32, a first spacer 33, the lower bearing 32, a second spacer 34, and an engaging member 35 are externally fitted to the boss 31 in this order. The engaging member 35 is a C-ring, for example, and is fitted to an annular groove 31b formed in the outer circumferential surface of the boss 31.

A biasing member 36 is provided between the second spacer 34 and the engaging member 35. The biasing member 36 is formed of, for example, a disc spring or a corrugated washer. As the two bearings 32 are biased toward the stepped portion 31a by the biasing member 36, the bearings 32 are suitably pre-loaded. An O-ring 37 is provided radially inside each bearing 32. The inner race 32b of each bearing 32 is fixed to the boss 31, whereas the outer race 32c is fixed to the casing 20.

As shown in FIG. 3, plural (eight in the present embodiment) plate-shaped collision members 23 are fixed to an inner wall surface 20c which is the outer one of the inner wall surfaces of the casing 20 in the radial direction, so as to protrude from the inner wall surface 20c toward the internal space 21. The liquid 22 may collide with the collision members 23 when moving in the circumferential direction. The collision members 23 are provided at regular intervals in the circumferential direction. The number and locations of the collision members 23 are not limited to the above-mentioned number and locations, and may be suitably changed.

Plural (eight in the present embodiment) plate members 5 each having a surface intersecting with the rotational direction of the liquid damper 4 are fixed to the outer circumferential surface of the liquid damper 4 (casing 20) to protrude radially outward along the radial directions. The plate members 5 are provided at regular intervals in the circumferential direction. The number and locations of the plate members 5 are not limited to the above-mentioned number and locations, and may be suitably changed.

In the liquid damper system 3 with the structure described above, as the rotating body 100 is rotationally driven by an unillustrated driver, the liquid damper 4 is rotated together by the friction of the bearings 32. As a result of the rotation of the liquid damper 4, air resistance is exerted against the plate members 5 which form the relative rotation unit (air resistance imparting member), and rotational resistance is exerted against the liquid damper 4. The rotational resistance increases as the rotation speed of the liquid damper 4 increases. When the magnitude of the rotational resistance exceeds the friction force of the bearings 32, the rotation speed of the liquid damper 4 starts to lag behind the rotating body 100. As a result, the liquid damper 4 starts to rotate relative to the rotating body 100.

In the liquid damper 4, as the liquid 22 collides with the collision members 23 while the rotating body 100 rotates, part of kinetic energy is converted to heat energy, with the result that the vibration of the rotating body 100 is suppressed. In particular, because the liquid damper 4 rotates relative to the rotating body 100 (non-synchronous rotation) as described above, the orbital revolution of the rotating body 100 due to whirling of the rotating body 100 does not coincide with the axial rotation of the liquid damper 4. It is therefore possible to prevent the liquid 22 from immovably adhering to the inner wall surface 20c of the casing 20 due to the centrifugal force, and to facilitate the collision of the liquid 22 onto the collision members 23.

Figure 4:
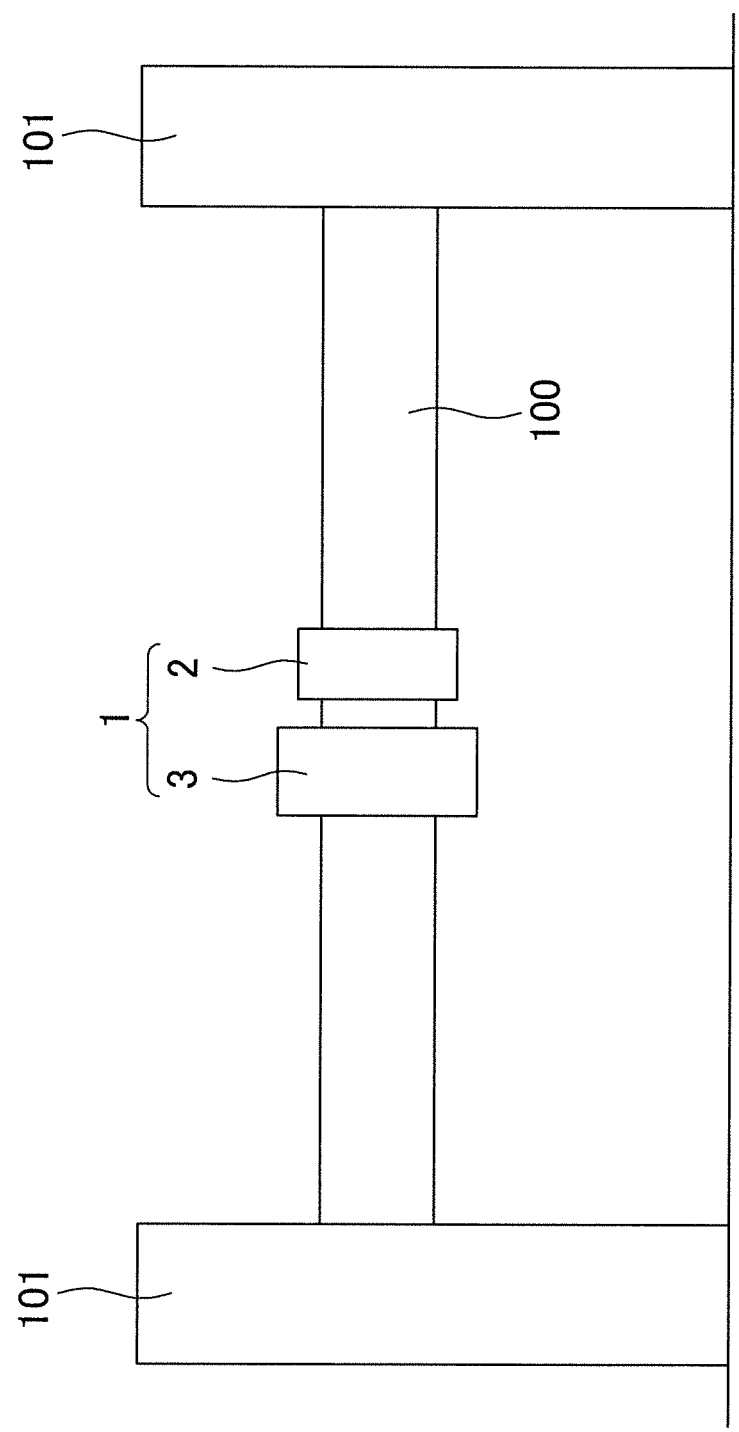
FIG. 4 is a side view showing a testing machine used in a verification experiment.
Figure 5:
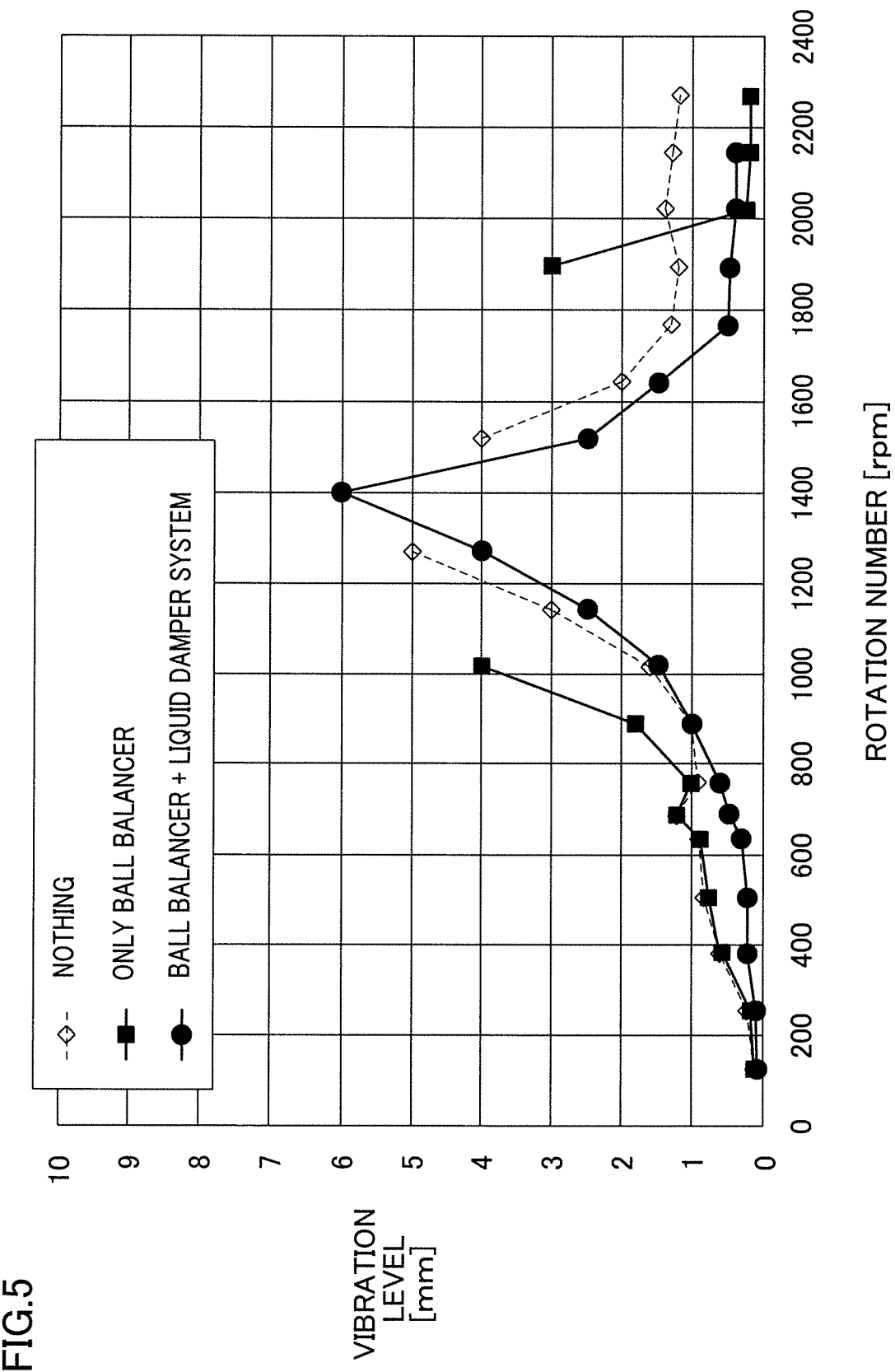
FIG. 5 is a graph showing experimentation results regarding a vibration damping effect.

As shown in FIG. 4, an experiment was done to verify the vibration damping effect of the rotating body 100. A testing machine used in the verification experiment is arranged such that the rotating body 100 extending along the horizontal direction is rotatably supported by both two supporters 101 on the left and right sides, and the vibration damping device 1 is attached to a substantially central portion in the axial direction of the rotating body 100. FIG. 5 is a graph showing experimentation results regarding a vibration damping effect. The verification experiment was done in a condition that neither the ball balancer 2 nor the liquid damper system 3 was attached to the rotating body 100 ("Nothing" in FIG. 5), in a condition that only the ball balancer 2 was attached to the rotating body 100 ("Only Ball Balancer" in FIG. 5), and in a condition that both of the ball balancer 2 and the liquid damper system 3 are attached to the rotating body 100 ("Ball Balancer+Liquid Damper System" in FIG. 5). In the verification experiment, a vibration level of the rotating body 100 was measured when steady rotation was achieved with each rotation number. The natural frequency of the rotating body 100 used in the experiment was 1380 rpm.

As shown in FIG. 5, when neither the ball balancer 2 nor the liquid damper system 3 was attached to the rotating body 100, vibration diverged in a resonance range including the natural frequency. Meanwhile, when only the ball balancer 2 was attached to the rotating body 100, the vibration level was decreased in a high-speed range which was on the high speed side of the natural frequency and was equal to or higher than about 2000 rpm, as compared to the case where nothing was attached. However, in a low-speed range which was on the low speed side of the high-speed range and was equal to or lower than about 2000 rpm, the vibration level was rather increased with the ball balancer 2, and the vibration diverged in a wide resonance range as compared to the case where nothing was attached. In other words, it was verified that, when only the ball balancer 2 was attached, even though the vibration damping effect was attained when the rotating body 100 rotated in the high-speed range, the vibration of the rotating body 100 was rather amplified when the rotating body 100 rotated in the low-speed range.

As such, when nothing was attached to the rotating body 100 or when only the ball balancer 2 was attached thereto, the vibration of the rotating body 100 diverged in the resonance range. It was therefore impossible to accelerate the rotating body 100 to reach 2000 rpm or higher beyond the resonance range. In the experiment, even though vibration occurred in the resonance range, the vibration level in the high-speed range was measured in a state that the rotating body 100 was accelerated to a rotation number higher than the resonance range while the vibration of the rotating body 100 was forcibly suppressed.

When both of the ball balancer 2 and the liquid damper system 3 were attached to the rotating body 100, the vibration level was decreased in the low-speed range as compared to the case where only the ball balancer 2 was attached. In particular, in the resonance range, the vibration level was suppressed to a level at which divergence of the vibration was prevented even in steady rotation, and hence acceleration of the rotating body 100 to the high-speed range beyond the resonance range was possible. In the high-speed range, while the vibration damping effect thanks to the attachment of the liquid damper system 3 was not observed, the vibration damping effect was attained by the ball balancer 2 which was effective in the high-speed range. As such, it was verified that the vibration was effectively damped in a wide range from the low-speed range to the high-speed range, with the concurrent use of the ball balancer 2 effective in the high-speed range and the liquid damper system 3 effective in the resonance range.

In the experiment, the weight of the rotating body 100 was about 2 kilograms and the weight of the water as the liquid 22 sealed in the liquid damper 4 was about 150 grams. A significant vibration damping effect was therefore achieved with the liquid 22 having weight less than 10% of the weight of the rotating body 100. A significant vibration damping effect was achieved with a small amount of the liquid 22, presumably because the apparent weight of the liquid 22 was increased by the centrifugal force and the energy of collision was increased.

Lastly, the following will describe a case where the above-described vibration damping device 1 is applied to a bobbin holder which is the rotating body 100. FIG. 6 is a side view showing a bobbin holder system 60 to which the vibration damping device 1 is attached. In the bobbin holder system 60, the vibration damping device 1 is attached to a bobbin holder 61. The bobbin holder 61 extends along the horizontal direction and is rotatably supported by both of two supporters 62 on the left and right sides. The vibration damping device 1 is attached to a substantially central portion in the axial direction of the bobbin holder 61. On the respective sides of the vibration damping device 1, bobbins 63 are attached to be aligned in the axial direction. As the bobbin holder 61 is rotated, yarns Y constituted by synthetic fibers made of polyester, etc. are wound onto the bobbins 63, with the result that plural packages are formed.

Advantageous Effects

In the vibration damping device 1 of the present embodiment, the liquid damper 4 is provided in addition to the ball balancer 2 (automatic balancer). In the liquid damper 4, as the liquid 22 collides with the collision members 23, part of kinetic energy is converted to heat energy, with the result that the vibration of the rotating body 100 is suppressed. The vibration damping effect of this liquid damper 4 is particularly conspicuous in the resonance range in which the liquid 22 greatly flows and tends to collide with the collision members 23. Furthermore, in the vibration damping device 1, because the liquid damper 4 rotates relative to the rotating body 100 thanks to the plate members 5 (relative rotation unit), the orbital revolution of the rotating body 100 due to whirling of the rotating body 100 does not coincide with the axial rotation of the liquid damper 4. It is therefore possible to prevent the liquid 22 from immovably adhering to the inner wall surface 20c of the liquid damper 4 due to the centrifugal force, and to facilitate the collision of the liquid 22 onto the collision members 23. On this account, the vibration is effectively suppressed even during constant rotation of the rotating body 100 in the resonance range. As such, the vibration damping device 1 is able to not only damp the vibration of the rotating body 100 in the high-speed range by the ball balancer 2 but also effectively damp the vibration in the resonance range by the liquid damper 4. The acceleration of the rotating body 100 to the high-speed range beyond the resonance range is therefore ensured.

In the present embodiment, the plate members 5 (air resistance imparting member) as the relative rotation unit of the present invention are provided to increase the air resistance when the liquid damper 4 rotates. With this arrangement, the rotational resistance is exerted against the liquid damper 4 when the liquid damper 4 rotates, and hence the rotation speed of the liquid damper 4 becomes lower than that of the rotating body 100. As a result, the liquid damper 4 rotates relative to the rotating body 100.

In the present embodiment, the plate members 5 each having a surface intersecting with the rotational direction of the liquid damper 4 are provided as the air resistance imparting member of the present invention. With this arrangement, rotational resistance is exerted as air collides with the plate members 5 when the liquid damper 4 rotates. As a result, the rotation speed of the liquid damper 4 becomes lower than that of the rotating body 100, and the liquid damper 4 rotates relative to the rotating body 100. Furthermore, because the air resistance imparting member is formed by the plate members 5, the air resistance imparting member is easily constructed.

In the present embodiment, the plate members 5 are provided on the outer circumferential surface of the liquid damper 4. Because the acting positions of the air resistance are distant from the center of the rotating body 100 of the liquid damper 4, the torque of the rotational resistance exerted against the liquid damper 4 is large. The rotation speed of the liquid damper 4 is therefore efficiently lowered, and the relative rotation of the liquid damper 4 with respect to the rotating body 100 is further ensured.

In the present embodiment, the ball balancer 2 in which the balls 11 are movably housed in the housing 10 is the automatic balancer. It is therefore possible to damp vibration of the rotating body 100 as the balls 11 move to positions where imbalance of the rotating body 100 is canceled out, when the rotating body 100 rotates. Furthermore, because the ball balancer 2 has a relatively simple structure among automatic balancers, the structure of the vibration damping device 1 is simplified.

In the present embodiment, the partitioning members 12 are provided to partition the internal space of the housing 10 into plural housing chambers 13 in the circumferential direction, at least one ball 11 is housed in each of the housing chambers 13, and the partitioning members 12 are arranged to prevent the ball 11 housed in the each housing chamber 13 from moving to another housing chamber 13. With this arrangement, the partitioning members 12 prevent the balls 11 from keep turning, and the balls 11 quickly move to the positions where the imbalance of the rotating body 100 is canceled out. When the rotating body 100 is provided crosswise as shown in FIG. 4, the balls 11 may not easily move upward on account of the gravity, etc., depending on the rotation speed of the rotating body 100 and the mass of the ball 11. The influence of the gravity is suppressed by the partitioning members 12, because the balls 11 are lifted by the partitioning members 12.

In the present embodiment, the vibration damping device 1 is attached to the rotating body 100 or the bobbin holder 61 which functions as the rotating body 100. The bobbin holder 61 tends to be used in the high-speed range which is, for example, equal to or higher than 2000 rpm, and typically has a natural frequency in the low-speed range which is on the low speed side of the high-speed range. As the vibration damping device 1 is attached to the bobbin holder 61, vibration is damped in the high-speed range in which the bobbin holder 61 is used, and acceleration of the bobbin holder 61 to the high-speed range beyond the resonance range is ensured.

In the present embodiment, the bobbin holder 61 is supported at the both ends and the vibration damping device 1 is attached to a substantially central portion in the axial direction of the bobbin holder 61. Because in the liquid damper 4 vibration is damped by the liquid 22 colliding with the collision members 23, the vibration damping effect is enhanced when the liquid damper 4 is attached to a portion where the vibration is significant. On this account, when the bobbin holder 61 is supported at the both ends, the vibration damping device 1 is attached to the central portion of the bobbin holder 61, where the vibration is most significant.

This makes it possible to improve the vibration damping effect of the liquid damper 4.

OTHER EMBODIMENTS

The following will describe modifications of the above-described embodiment.

Figure 7A:
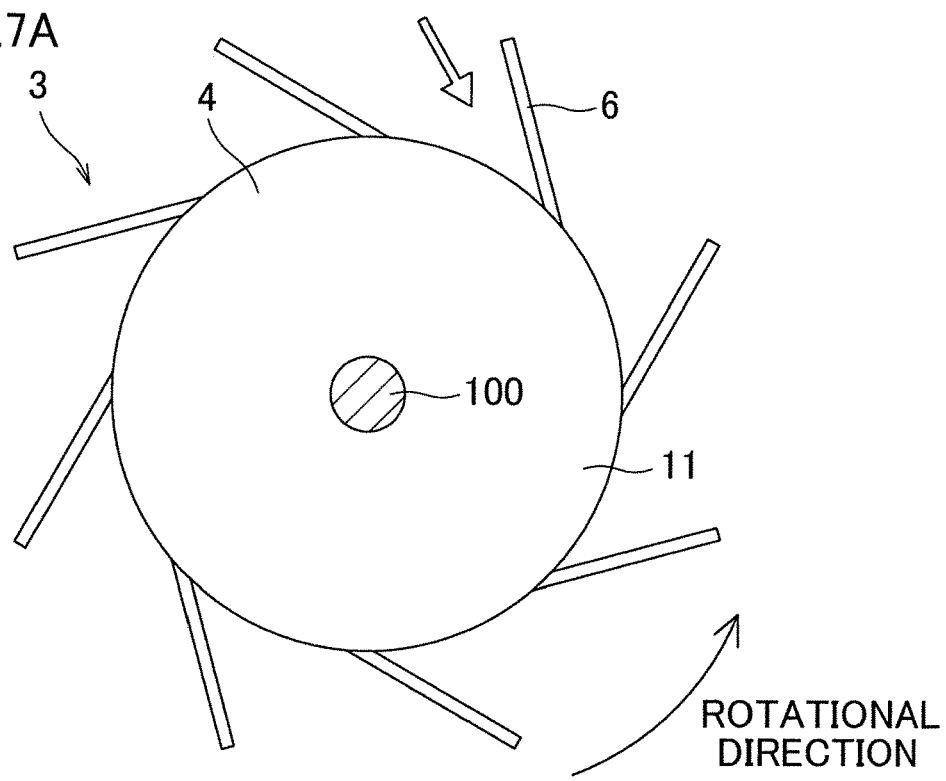
FIG. 7 is a top view showing a modification of the relative rotation unit.

(1) In the embodiment above, the plate members 5 are provided along radial directions. Alternatively, as shown in FIG. 7(a), in place of the radially-extending plate members 5, plate members 6 may be provided. Each of the plate members 6 is inclined toward the downstream side in the rotational direction of the liquid damper 4 from the base end which is closest to the center of the rotating body 100 of the liquid damper 4. With these plate members 6, escape of air radially outward along the plate members 6 is suppressed when the liquid damper 4 rotates. Furthermore, as indicated by an outlined arrow in FIG. 7, air tends to be trapped between each plate member 6 and the liquid damper 4, with the result that more air resistance is exerted against the plate members 6.

Figure 7B:
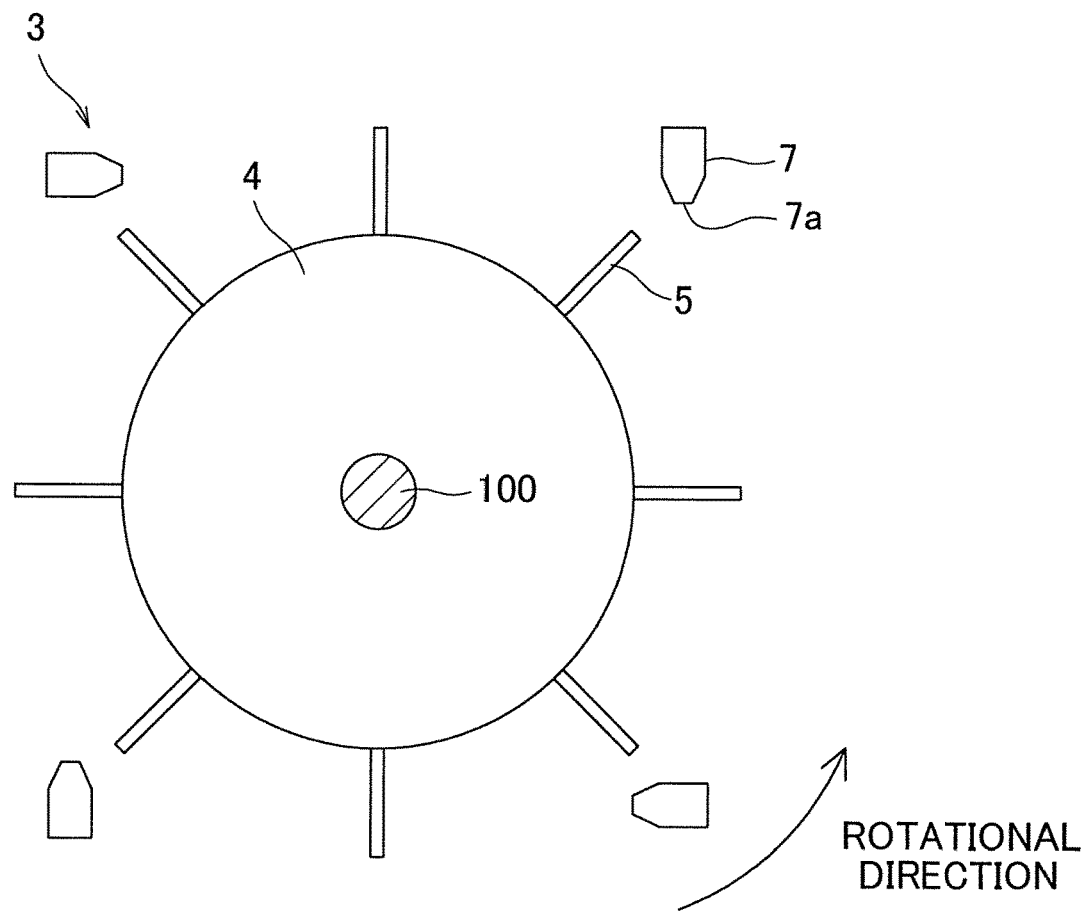

(2) In addition to the plate members 5 of the embodiment above, fluid blowing units 7 may be provided as shown in FIG. 7(b). The fluid blowing units 7 are provided around the liquid damper 4, and blow fluid such as air from outlets 7a. As each of the outlets 7a is provided to blow fluid in a direction substantially opposite to the rotational direction of the liquid damper 4, the fluid blowing units 7 are able to exert hydraulic pressure against the plate members 5 in the direction opposite to the rotational direction of the liquid damper 4. This increases the rotational resistance exerted against the plate members 5, and hence the relative rotation of the liquid damper 4 with respect to the rotating body 100 is further ensured. The number and locations of the fluid blowing units 7 may be different from those shown in FIG. 7(b). For example, only one fluid blowing unit 7 may be provided.

Figure 8:
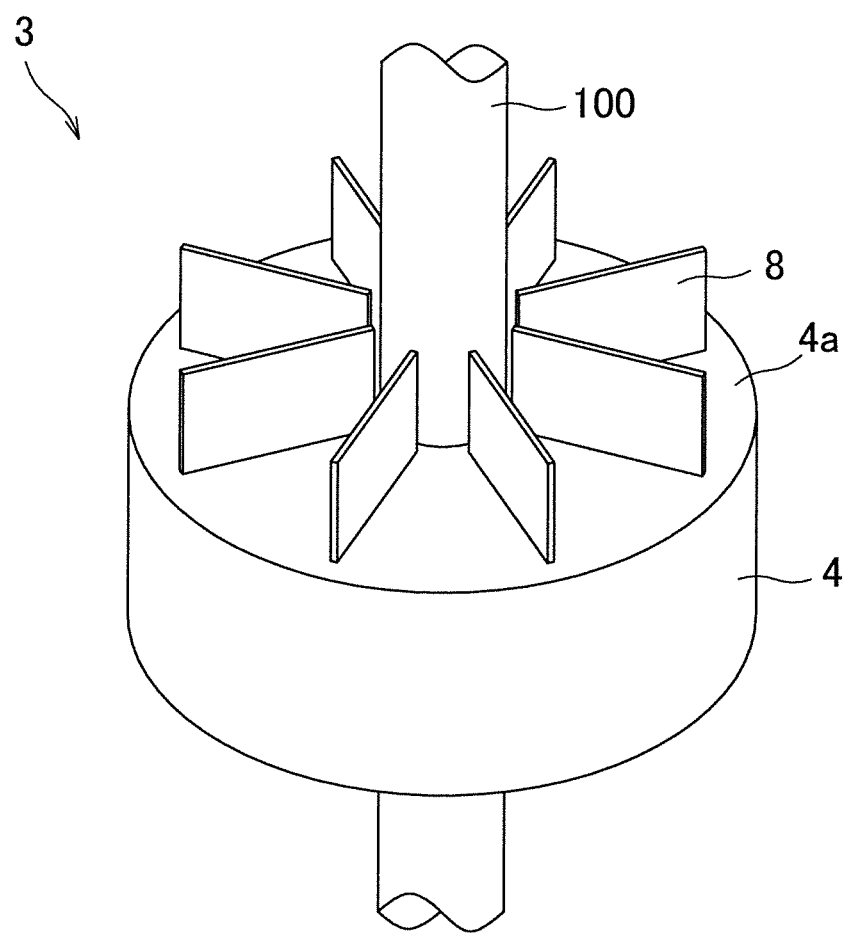
FIG. 8 is a perspective view showing a modification of the relative rotation unit.

(3) While in the embodiment above the plate members 5 are provided on the outer circumferential surface of the liquid damper 4, plate members 8 may be provided on an end face (top or bottom surface) in the axial direction of the liquid damper 4 as shown in FIG. 8. While in FIG. 8 the plate members 8 are provided on the top surface 4a of the liquid damper 4, the plate members 8 may be provided on the bottom surface in addition to or in place of those on the top surface 4a. This arrangement prevents the vibration damping device 1 from being upsized in the radial directions, and makes it possible to downsize the vibration damping device 1.

Figure 9:
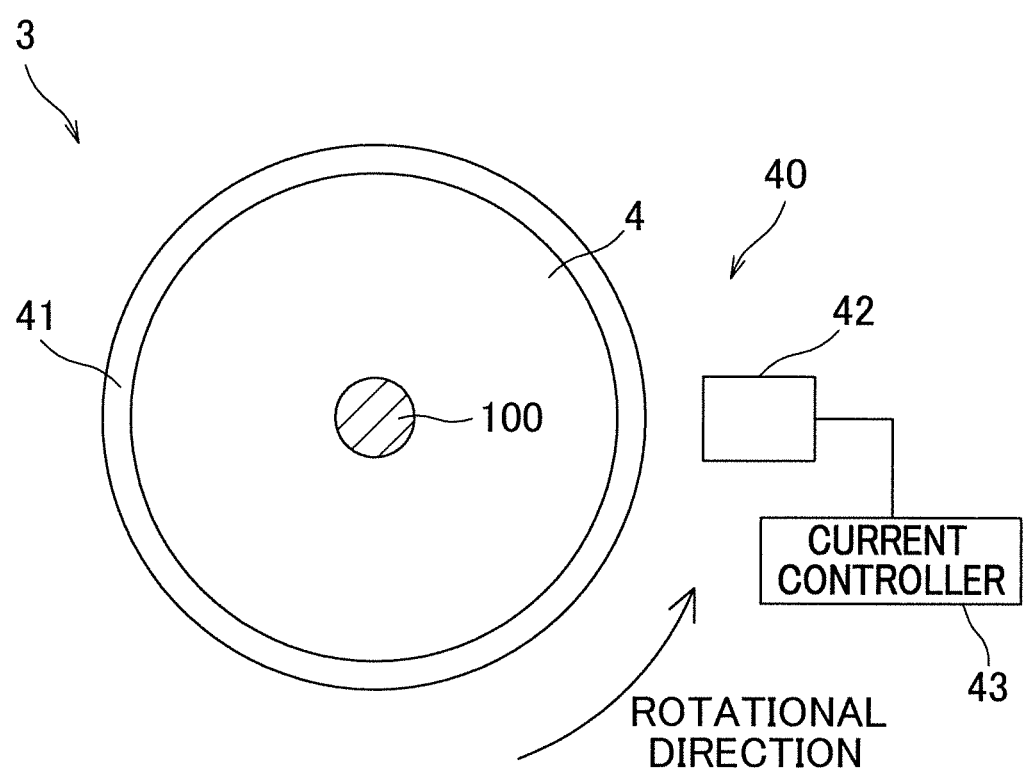
FIG. 9 is a top view showing a modification of the relative rotation unit.

(4) While in the embodiment above the plate members 5 (air resistance imparting member) are provided as the relative rotation unit by which the liquid damper 4 is rotated relative to the rotating body 100, the relative rotation unit may have a different structure. For example, an electromagnetic brake mechanism 40 may be provided as the relative rotation unit as shown in FIG. 9. This brake mechanism 40 includes a conductor (electromagnetic effect target) provided on the outer circumferential surface of the liquid damper 4, a coil 42 (electromagnetic effector) provided to be distanced from the outer circumferential surface of the liquid damper 4, and a current controller 43 configured to control a current supplied to the coil 42. The numbers and locations of the conductor 41 and the coil 42 may be different from those shown in FIG. 9, and are suitably changeable. For example, plural coils 42 may be provided at regular intervals along the circumferential direction of the liquid damper 4.

When a current is supplied to the coil 42 by the current controller 43, magnetic force acting between a magnetic flux generated around the coil 42 on account of electromagnetic induction and a magnetic flux due to an eddy current generated at the conductor 41 on the liquid damper 4 functions as braking force. As the brake mechanism 40 exerts the braking force to the liquid damper 4 when the liquid damper 4 rotates, the rotation speed of the liquid damper 4 is arranged to be lower than that of the rotating body 100. As a result, the liquid damper 4 rotates relative to the rotating body 100. In this regard, large braking force can be obtained when the conductor 41 is formed of a magnetic body, because a large eddy current is generated.

In connection with the above, the magnitude of a magnetic field generated at the coil 42 can be changed by changing the current supplied to the coil 42 by the current controller 43, and this makes it possible to change the braking force acting between the conductor 41 and the coil 42. It is therefore possible to adjust the rotation speed of the liquid damper 4 in accordance with the state of vibration of the rotating body 100, and to further improve the vibration damping effect.

The electromagnetic effect target provided on the outer circumferential surface of the liquid damper 4 may be not the conductor 41 but a permanent magnet. With this arrangement, large brake torque can be obtained by suitably controlling the frequency of an alternating current supplied to the coil 42 by the current controller 43 connected to the coil 42. Furthermore, the electromagnetic effector may be not the coil 42 but a permanent magnet. With this arrangement, the current controller 43 can be omitted and the relative rotation unit can be constructed relatively easily.

Alternatively, a coil may be provided in place of the conductor 41 as the electromagnetic effect target on the liquid damper 4, and a permanent magnet may be provided in place of the coil 42 as the electromagnetic effector exerting an electromagnetic effect to the electromagnetic effect target. In this case, the rotation speed of the liquid damper 4 is adjustable by moving the permanent magnet and changing the distance between the permanent magnet and the coil on the liquid damper 4.

Figure 10:
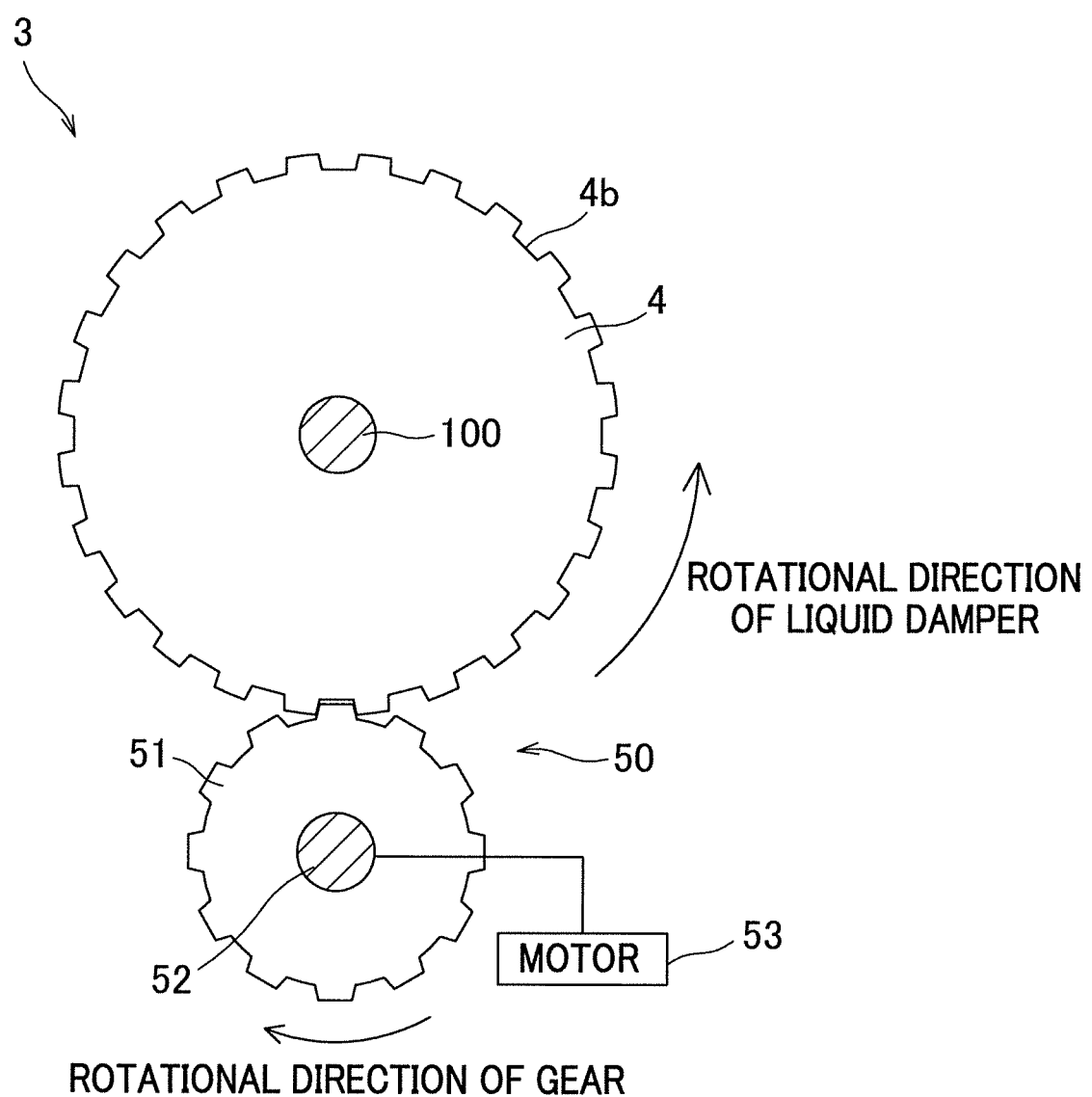
FIG. 10 is a top view showing a modification of the relative rotation unit.

(5) A gear mechanism 50 may be provided as the relative rotation unit which causes the liquid damper 4 to rotate relative to the rotating body 100, as shown in FIG. 10. This gear mechanism includes gear portions 4b formed on the outer circumferential surface of the liquid damper 4, a gear 51 engaged with the gear portions 4b, a rotation shaft 52 which is connected to the gear 51 and is substantially parallel to the rotating body 100, and a motor 53 (drive unit) which has an unillustrated output shaft connected to the rotation shaft 52 and rotationally drives the rotation shaft 52. A housing (not illustrated) of the motor 53 is, for example, attached to the rotating body 100 via a bearing with substantially zero friction. The housing is provided so that the motor 53 does not change its position when the liquid damper 4 rotates.

The gear 51 rotates in the direction shown in FIG. 10 as the liquid damper 4 rotates. In this regard, when the motor 53 is driven at a frequency lower than the rotation frequency of the gear 51 which is in sync with the rotation of the liquid damper 4, the motor 53 functions as a brake. Rotational resistance torque is therefore exerted to the liquid damper 4 which is rotated by the rotating body 100, with the result that the rotation speed of the liquid damper 4 becomes lower than that of the rotating body 100. As a result, the liquid damper 4 rotates relative to the rotating body 100.

The motor 53 is preferably a variable-speed motor in which the rotation speed of the output shaft is variable. With this arrangement, the rotation speed of the gear 51 is changeable, and the rotation speed of the liquid damper 4 is changeable. It is therefore possible to adjust the rotation speed of the liquid damper 4 in accordance with the state of vibration of the rotating body 100, and to further improve the vibration damping effect.

(6) In the embodiment above, the collision members 23 protrude toward the internal space 21 from the inner wall surface 20c which is outer one of the inner wall surfaces of the casing in the radial direction. Alternatively, the collision members 23 may protrude toward the internal space 21 from the inner one of the inner wall surfaces of the casing 20 in the radial direction, or may protrude toward the internal space 21 from the ceiling surface or bottom surface of the casing 20. Alternatively, the collision member may be a plate-shaped member which is provided across the entirety of the space between the inner wall surface which is the outer one in the radial direction and the inner wall surface which is the inner one in the radial direction, and has an opening or a notch portion circumferentially penetrating the plate-shaped member. The collision member may be not plate-shaped but columnar or block-shaped. Furthermore, the collision member may be an uneven portion or a corrugated portion formed on the side surface or the bottom surface of the casing 20.

(7) In the embodiment above, the internal space 21 of the casing 20 is a single chamber. Alternatively, a partition wall may be provided along the circumferential direction of the internal space 21 to radially divide the internal space 21 into plural spaces. In this case, the collision member 23 is provided in each of the spaces formed by the division.

(8) While in the embodiment above the rotation speed of the liquid damper 4 is arranged to be lower than the rotation speed of the rotating body 100, the liquid damper 4 may be arranged to rotate relative to the rotating body 100 by setting the rotation speed of the liquid damper 4 to be higher than that of the rotating body 100. For example, the direction of blowing air out from each fluid blowing unit 7 shown in FIG. 7(b) may be changed to exert the hydraulic pressure in the rotational direction of the liquid damper 4. Alternatively, when the gear mechanism 50 (see FIG. 10) is used as the relative rotation unit, the rotation speed of the liquid damper 4 may be arranged to be higher than that of the rotating body 100 by using the motor 53.

The rotational direction of the liquid damper 4 may be opposite to the rotational direction of the rotating body 100. For example, the liquid damper 4 may be rotated in the direction opposite to the rotational direction of the rotating body 100 by increasing the speed of fluid blown out from the fluid blowing units 7 shown in FIG. 7(b). Alternatively, when the gear mechanism 50 (see FIG. 10) is used as the relative rotation unit, the rotational direction of the liquid damper 4 may be arranged to be opposite to that of the rotating body 100 by using the motor 53.

(9) In the embodiment above, as shown in FIG. 2, the inside of the housing 10 of the ball balancer 2 is divided into two housing chambers 13 in the circumferential direction, and one ball 11 is housed in each housing chamber 13. In this regard, the number of the housing chambers 13 may be three or more, and the number of the balls 11 housed in each housing chamber 13 may not be one, and may be two or more. The inside of the housing 10 may not be divided into plural housing chambers 13. The inside of the housing 10 may be a single space, without the partitioning members 12. In this case, two or more balls 11 are housed in the housing 10.

(10) In the embodiment above, the ball balancer 2 is provided as the automatic balancer. In this regard, the automatic balancer of the vibration damping device 1 may have a different structure on condition that the imbalance of the rotating body 100 is canceled out as a mass body moves around the rotating body 100 when the rotating body 100 rotates. For example, in place of the ball balancer 2, a pendulum balancer 80 shown in FIG. 11(a), a ring balancer 90 shown in FIG. 11(b), or an unillustrated liquid balancer may be used.

Figure 11A:
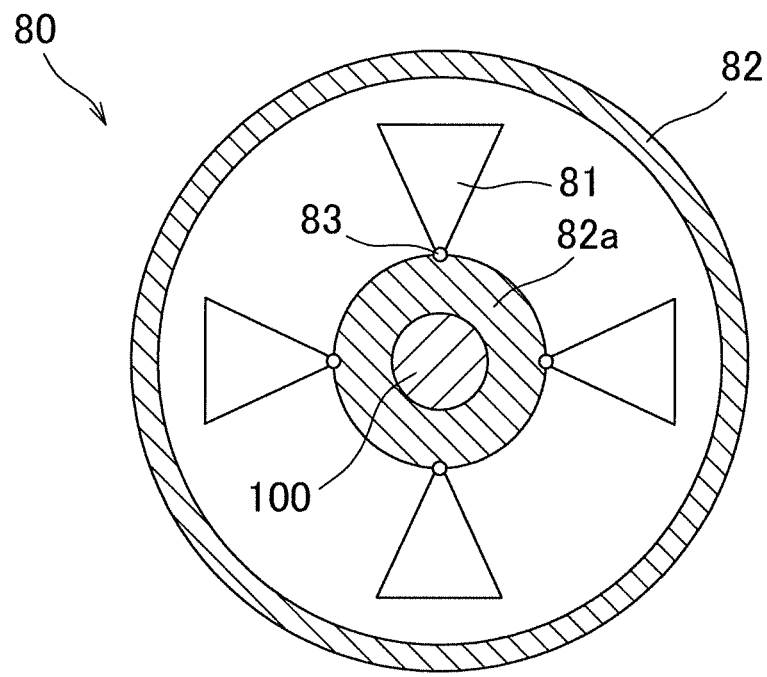
FIG. 11 is a top view showing a modification of an automatic balancer.

As shown in FIG. 11(a), the pendulum balancer 80 includes plural pendulums 81 each of which is capable of swinging in the circumferential direction. The pendulums 81 are attached to a boss portion 82a of a cylindrical casing 82 fixed to the rotating body 100, and each swings in the circumferential direction about a fulcrum 83. Vibration of the rotating body 100 is damped as the pendulums 81 swing in the circumferential direction and move to positions where imbalance of the rotating body 100 is canceled out, when the rotating body 100 rotates.

Figure 11B:
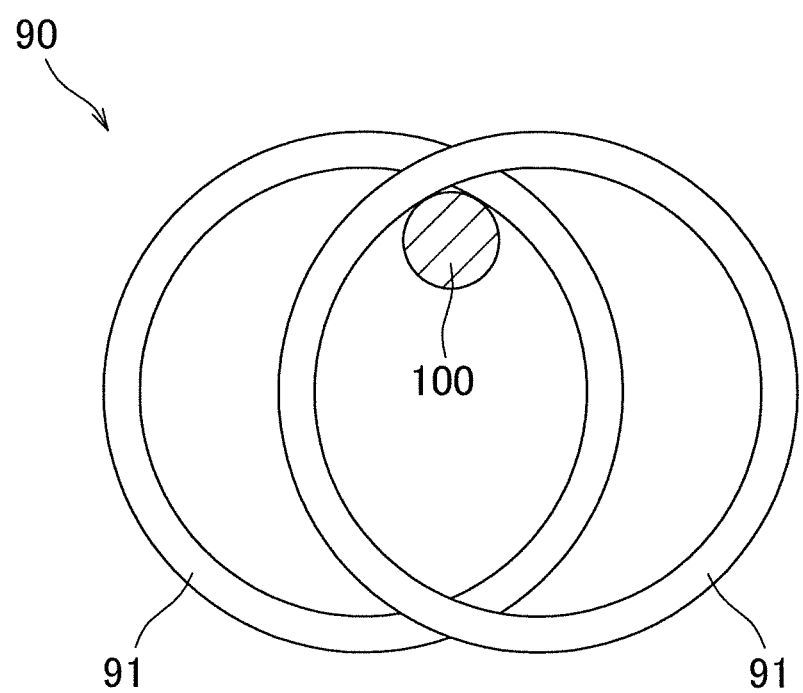

As shown in FIG. 11(b), the ring balancer 90 includes ring members 91 which are rotatable around the rotating body 100. The ring members 91 are aligned in the axial direction of the rotating body 100 and the rotating body 100 are provided inside the ring members 91. To the rotating body 100, an unillustrated engaging member is attached to restrict the movement of the ring members 91 in the axial direction. Vibration of the rotating body 100 is damped as the ring members 91 rotate around the rotating body 100 and move to positions where imbalance of the rotating body 100 is canceled out, when the rotating body 100 rotates.

The liquid balancer is arranged so that liquid is movably sealed in a casing. Vibration of the rotating body 100 is damped as the liquid is spread to cancel out the imbalance of the rotating body 100 when the rotating body 100 rotates. A balancer in which particles are sealed in place of liquid is also able to damp the vibration of the rotating body 100 on the same principle as the liquid balancer.

(11) While in the embodiment above the vibration damping device 1 is attached to the substantially central portion in the axial direction of the bobbin holder 61 supported at the both ends as shown in FIG. 6, the attaching position of the vibration damping device 1 may be suitably changed.

The bobbin holder 61 may not be supported at the both ends. For example, the bobbin holder 61 may be cantilevered by a supporter 62 as shown in FIG. 12. In this case, the vibration damping device 1 is preferably attached to an end portion on the free end side of the bobbin holder 61 where vibration tends to be significant, because the vibration damping effect of the liquid damper 4 is enhanced. The vibration damping effect of the liquid damper 4 is further enhanced by attaching the liquid damper 4 (liquid damper system 3) at a location on the free end side of the bobbin holder 61 as compared to the ball balancer 2. Alternatively, the vibration damping device 1 may be attached to an end portion on the fixed end side of the bobbin holder 61 or at a central portion of the bobbin holder 61, and the liquid damper 4 (liquid damper system 3) may be attached to a location on the fixed end side of the bobbin holder 61 as compared to the ball balancer 2.

When there is a predetermined resonance mode in which bending of the bobbin holder 61 occurs, the vibration damping effect of the liquid damper 4 is improved by attaching the vibration damping device 1 to a location on the bobbin holder 61 corresponding to antinode of vibration in the resonance mode, i.e., to a location where the variation is maximized. The central portion of the bobbin holder 61 when it is supported at the both ends and the end portion on the free end side of the bobbin holder 61 when it is cantilevered are considered to be more or less equivalent to the location of the antinode.

As shown in FIG. 13, the bobbin holder 61 may include a shaft portion 61*a* and a cylindrical portion 61*b*, and the vibration damping device 1 may be provided inside the bobbin holder 61 when there is a space between the shaft portion 61*a* and the cylindrical portion 61*b*, where the vibration damping device 1 can be provided. As such, the vibration damping effect for the bobbin holder 61 is improved by providing the vibration damping device 1 inside the bobbin holder 61. Furthermore, when the vibration damping device 1 is provided inside the bobbin holder 61, the following effects are attained: improvement in the degree of freedom in the attachment positions of the bobbins 63 on the bobbin holder 61; increase in the maximum number of the bobbins 63 attachable to the bobbin holder 61; and improvement in workability when the bobbins 63 are attached to and detached from the bobbin holder 61.

(12) While the embodiment describes the cases where the vibration damping device 1 is attached to the bobbin holder 61, the vibration damping device 1 may be attached to a rotating body 100 which is not the bobbin holder 61.

REFERENCE SIGNS LIST 1 vibration damping device
2 ball balancer (automatic balancer)
3 liquid damper system
4 liquid damper
4*b* gear portion
5, 6, 8 plate member (relative rotation unit, air resistance imparting member)
10 housing
11 ball
12 partitioning member
13 housing chamber
20 casing
22 liquid
23 collision member
40 brake mechanism (relative rotation unit)
41 conductor (electromagnetic effect target)
42 coil (electromagnetic effector)
50 gear mechanism (relative rotation unit)
51 gear
53 motor (drive unit)
60 bobbin holder system
61 bobbin holder
63 bobbin
100 rotational body
Y yarn

The invention claimed is:

1. A vibration damping device damping vibration of a rotating body, comprising:
an automatic balancer which is configured to cancel out imbalance of the rotating body when the rotating body rotates;
a liquid damper which is coaxially rotatable with the rotating body and includes a collision member provided in a casing in which liquid is sealed, the liquid colliding with the collision member when the liquid moves in a circumferential direction; and
a relative rotation unit which is configured to cause the liquid damper to rotate relative to the rotating body.

2. The vibration damping device according to claim 1, wherein, an air resistance imparting member which increases air resistance during rotation of the liquid damper is provided as the relative rotation unit.

3. The vibration damping device according to claim 2, wherein, the air resistance imparting member is a plate member having a surface intersecting with the rotational direction of the liquid damper.

4. The vibration damping device according to claim 3, wherein, the plate member is provided on the outer circumferential surface of the liquid damper.

5. The vibration damping device according to claim 3, wherein, the plate member is provided on an end face in the axial direction of the liquid damper.

6. The vibration damping device according to claim 1, wherein, a brake mechanism is provided as the relative rotation unit, the brake mechanism including:
an electromagnetic effect target which is provided on the liquid damper and to which an electromagnetic effect is exerted; and
an electromagnetic effector configured to exert the electromagnetic effect to the electromagnetic effect target.

7. The vibration damping device according to claim 1, wherein, a gear mechanism is provided as the relative rotation unit, the gear mechanism including:
a gear portion which is formed on the outer circumferential surface of the liquid damper;
a gear which is engaged with the gear portion; and
a drive unit configured to generate rotational torque in the liquid damper by rotating the gear.

8. The vibration damping device according to claim 1, wherein, the automatic balancer is a ball balancer in which balls are movably housed in a housing.

9. The vibration damping device according to claim 8, wherein,
a partitioning member is provided to divide the inside of the housing into plural housing chambers in the circumferential direction,
at least one ball is housed in each of the housing chambers, and
the partitioning member prevents the ball housed in each of the housing chambers from moving to another housing chamber.

10. The vibration damping device according to claim 1, wherein, the automatic balancer is a pendulum balancer including pendulums which are swingable in the circumferential direction of the rotating body.

11. The vibration damping device according to claim 1, wherein, the automatic balancer is a ring balancer including ring members which are rotatable around the rotating body.

12. The vibration damping device according to claim 1, wherein, the automatic balancer is a liquid balancer in which liquid is movably sealed in a casing.

13. A bobbin holder system comprising:
a bobbin holder to which a bobbin is attached, the bobbin holder rotating so as to form a package by winding a yarn made of synthetic fibers onto the bobbin; and
the vibration damping device according to claim 1, which is attached to the bobbin holder functioning as the rotating body.

14. The bobbin holder system according to claim 13, wherein, the vibration damping device is attached to a location on the bobbin holder corresponding to antinode of vibration in a predetermined resonance mode in which bending of the bobbin holder occurs.

15. The bobbin holder system according to claim 13, wherein,
the bobbin holder is cantilevered, and
the vibration damping device is attached to an end portion on the free end side of the bobbin holder.

16. The bobbin holder system according to claim 15, wherein, the cantilevered bobbin holder includes a first end side and a free end side opposite to the first end side, the bobbin holder being secured to a support at the first end side, and
wherein the liquid damper is attached to a portion on the free end side of the bobbin holder a first distance from the support and the automatic balancer is attached to a portion on the free end side of the bobbin holder a second distance from the support, wherein the first distance is greater than the second distance.

17. The bobbin holder system according to claim 13, wherein,
the bobbin holder is supported at both ends, and
the vibration damping device is attached to a substantially central portion in the axial direction of the bobbin holder.

18. The bobbin holder system according to claim 13, wherein, the vibration damping device is provided inside the bobbin holder.

* * * * *